United States Patent
Viduya et al.

(10) Patent No.: US 7,391,863 B2
(45) Date of Patent: Jun. 24, 2008

(54) METHOD AND SYSTEM FOR AN INTERCHANGEABLE HEADSET MODULE RESISTANT TO MOISTURE INFILTRATION

(75) Inventors: Andres Viduya, Cranberry Township, PA (US); Douglas Mark Zatezalo, Allison Park, PA (US)

(73) Assignee: Vocollect, Inc., Pittsburgh, PA (US)

( * ) Notice: Subject to any disclaimer, the term of this patent is extended or adjusted under 35 U.S.C. 154(b) by 771 days.

(21) Appl. No.: 10/874,972

(22) Filed: Jun. 23, 2004

(65) Prior Publication Data

US 2005/0286717 A1    Dec. 29, 2005

(51) Int. Cl.
*H04M 9/00* (2006.01)
*H04M 1/00* (2006.01)
*H04R 25/00* (2006.01)

(52) U.S. Cl. .................. 379/430; 379/440; 381/374; 381/375

(58) Field of Classification Search ................. 379/430, 379/428.01, 428.02, 433.01, 433.02, 382, 379/386; 381/186, 370, 371, 374–375, 377–379
See application file for complete search history.

(56) References Cited

U.S. PATENT DOCUMENTS

| | | | |
|---|---|---|---|
| 4,302,635 A * | 11/1981 | Jacobsen et al. ............ 381/371 |
| 4,418,248 A | 11/1983 | Mathis | |
| 4,472,607 A | 9/1984 | Houng | |
| 4,499,593 A | 2/1985 | Antle | |
| 4,634,816 A | 1/1987 | O'Malley | |
| 4,689,822 A | 8/1987 | Houng | |
| 4,875,233 A | 10/1989 | Derhaag | |
| 5,018,599 A | 5/1991 | Dohi | |
| 5,197,332 A | 3/1993 | Shennib | |
| 5,381,486 A | 1/1995 | Ludeke | |
| 5,446,788 A | 8/1995 | Lucey | |
| 5,469,505 A | 11/1995 | Gattey | |
| 5,555,554 A | 9/1996 | Hofer | |
| 5,579,400 A | 11/1996 | Ballein | |
| 5,781,644 A | 7/1998 | Chang | |
| 5,793,878 A | 8/1998 | Chang | |
| 5,832,098 A | 11/1998 | Chen | |
| 5,890,074 A | 3/1999 | Rydbeck | |
| 6,075,857 A | 6/2000 | Doss, Jr. | |
| 6,078,825 A | 6/2000 | Hahn et al. | |
| 6,101,260 A | 8/2000 | Jensen et al. | |
| 6,230,029 B1 | 5/2001 | Hahn et al. | |
| 6,373,942 B1 | 4/2002 | Braund | |
| 6,374,126 B1 | 4/2002 | MacDonald, Jr. et al. | |
| 6,466,681 B1 * | 10/2002 | Siska et al. ................. 381/372 |
| 2001/0017925 A1 * | 8/2001 | Ceravolo .................... 381/370 |
| 2001/0017926 A1 | 8/2001 | Vicamini | |
| 2001/0036291 A1 * | 11/2001 | Pallai ......................... 381/382 |
| 2002/0009191 A1 | 1/2002 | Lucey et al. | |
| 2002/0085733 A1 | 7/2002 | Cottrell | |
| 2002/0131616 A1 | 9/2002 | Bronnikov et al. | |
| 2003/0068061 A1 | 4/2003 | Huang | |
| 2007/0223766 A1 * | 9/2007 | Davis et al. ................. 381/379 |

* cited by examiner

*Primary Examiner*—Curtis Kuntz
*Assistant Examiner*—Phylesha L Dabney
(74) *Attorney, Agent, or Firm*—Wood, Herron & Evans, LLP

(57) ABSTRACT

A headset assembly includes a moisture-proof and temperature resistant headset module. The headset module is sealed against moisture and is constructed from materials that are durable and can withstand constant use, physical abuse, and rapid swings in temperature and other environmental conditions. Furthermore, the headset module is interchangeable with a variety of headset frames so as to provide comfort during prolonged use and in high ambient noise environments.

27 Claims, 5 Drawing Sheets

METHOD AND SYSTEM FOR AN INTERCHANGEABLE HEADSET MODULE RESISTANT TO MOISTURE INFILTRATION

TECHNICAL FIELD

The present invention relates to a headset and, more particularly, to a headset for use in a wireless communications device.

BACKGROUND ART

A wireless communications device, useful in many situations, typically includes a headset that communicates with a portable computer worn by an operator. The portable computer, in turn, communicates with a central station over a radio-frequency network. Such a device allows the operator to freely move around a large area, such as a warehouse, and continually remain in communication with the central station.

The environments in which such wireless communications devices can be used include a wide variety of conditions. One of the more common environments involves picking and stocking operations at a warehouse or similar logistics center. In such an environment, the headset of the wireless communications device is subject to various levels of abuse. This abuse includes receiving forceful impacts from numerous different sources, being exposed to moisture and temperature of the outside environment, and being exposed to environmental variations that accompany movement from one ambient environment to another. The headsets typically house electronic equipment that is easily damaged by moisture infiltration and variations in temperature.

Additionally, the headset should withstand constant manipulation by the operator and remain comfortable during prolonged use. Some environments include high levels of ambient noise and require the headset to function properly in such an environment. In other, less noisy environments, a light weight headset may be beneficial to reduce fatigue on the operator. Thus, different headsets are often employed depending on the anticipated environment.

Currently, there exists a need, unmet by the prior art, for a robust headset for a wireless communications device that resists moisture, resists temperature variations, is constructed from strong, corrosion resistant material and is comfortable for prolonged use. Additionally, there exists the need for such a headset that operates within high ambient noise environments as well as more normal noise level environments.

BRIEF DESCRIPTION OF THE DRAWINGS

The accompanying drawings, which are incorporated in and constitute a part of this specification, illustrate embodiments of the invention and, together with the detailed description of the embodiments given below, serve to explain the principles of the invention.

DETAILED DESCRIPTION OF SPECIFIC EMBODIMENTS

Figure 1:
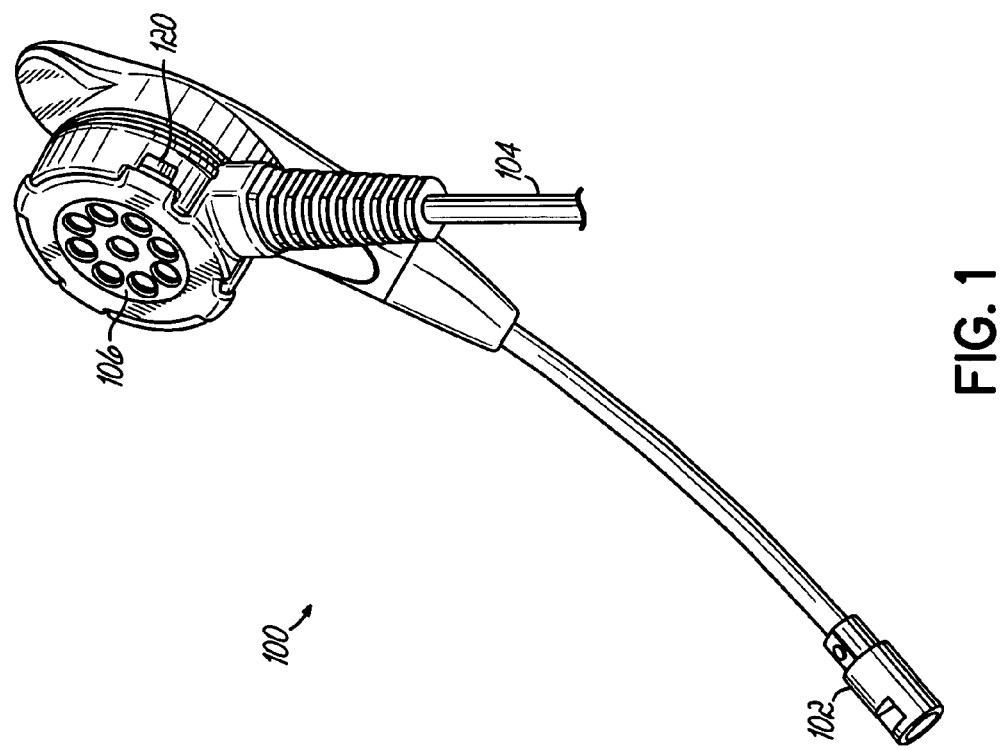
FIG. 1 illustrates a headset module in accordance with the principles of the present invention that may operate with different headset frames.

FIG. 1 illustrates an exemplary headset module 100 in accordance with the principles of the present invention. The module 100 can be interchangeably connected with different headset frames such as, for example, a lightweight headset or a headset designed for high ambient noise environments. Having a single interchangeable module 100 that can be used with different headset frames simplifies manufacturing, repairing, and warehousing of different headsets and their components because only a single model of headset module 100 is needed for either environment.

In operation, the headset module 100 is coupled with a headset frame (not shown) and includes a microphone 102 in which the operator speaks. In the exemplary embodiment shown, the speech captured by the microphone 102 is then transmitted via an antenna 104 to either a central station or a local relay station via electromagnetic waves. In particular embodiments of the present invention, the local relay station is a portable computer platform wearable by the operator. Alternatively, the headset module 100 headset frame may be connected via a wire to the computer worn by the operator. Two-way communications exist between the central station and the headset module 100 such that the central station may transmit RF signals that are ultimately received by the headset module 100 and output as sound via a speaker 106.

In accordance with one exemplary embodiment of the present invention, the headset module 100 bi-directionally communicates with a portable computer (not shown) worn by an operator via RF signals. In addition, the portable computer communicates over a wireless network with the central server. In this manner, speech data received via the microphone 102 is transmitted to the central server and data transmitted from the central server is output as speech via the speaker 106. The portable computer or the central server advantageously performs speech recognition functions based on speech captured via the microphone 102.

Figure 2A:
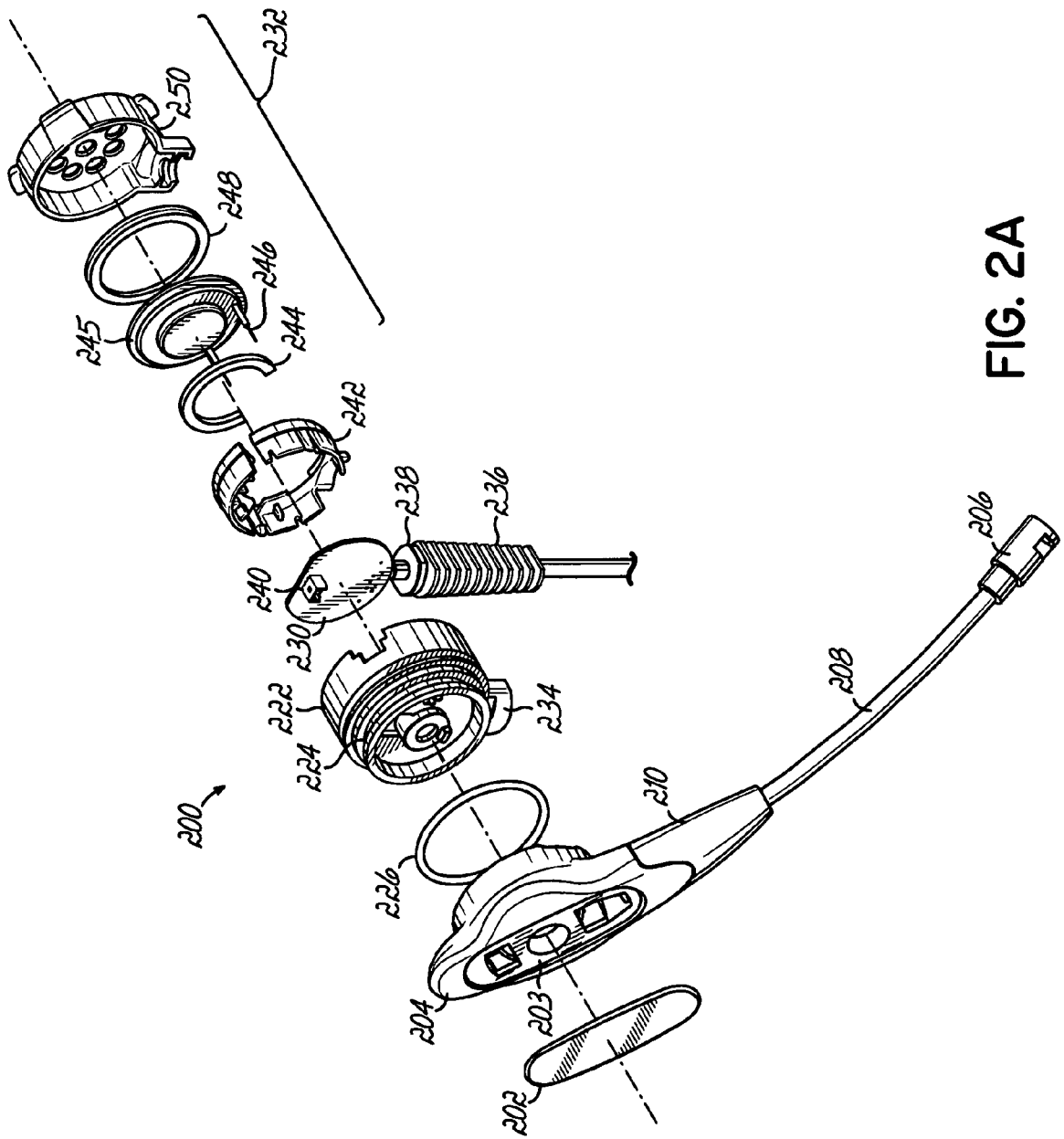
FIG. 2A and FIG. 2B illustrate different perspectives of an exploded view of the headset module of FIG. 1.
Figure 2B:
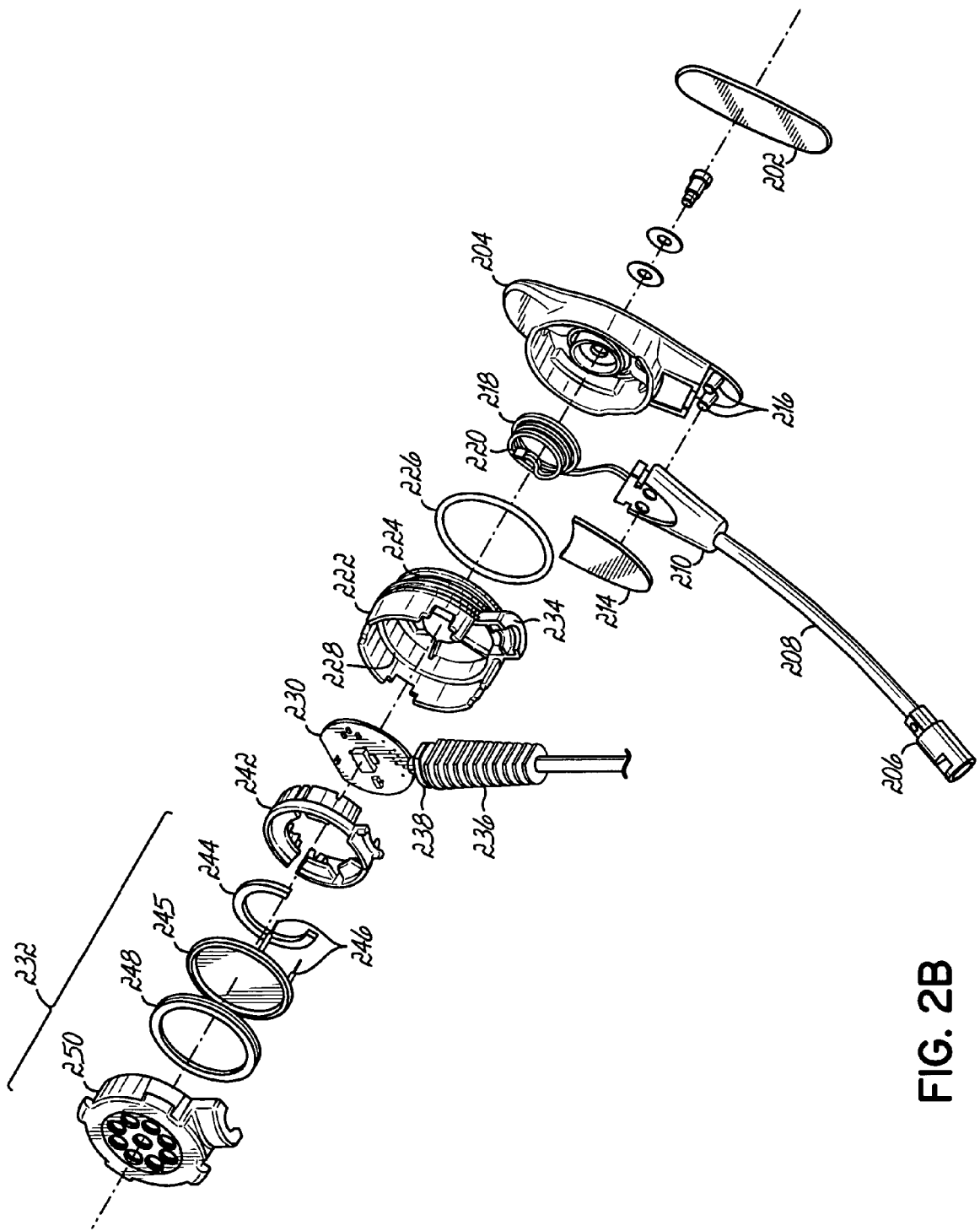

FIGS. 2A and 2B show an exploded view of an exemplary headset module 200 such as the one depicted in FIG. 1. These figures depict the same headset module 200 but show an exploded view of the module 200 from two different perspectives. Some features may be more clearly appreciated from one of the perspectives as compared with the other.

Starting at the left of FIG. 2A and the right of FIG. 2B, a label plate 202 may be included that is constructed from plastic or similar material. The label plate 202 can include markings or other indicia that identifies a manufacturer of the headset module 200 or, possibly, an end-user of the headset module 200. The label plate 202 is advantageously attached to a housing 204 with adhesive and may be sized to fit within a complimentary shaped cavity 203 within the housing 204. FIG. 2B depicts an optional screw and washer arrangement that may help couple the plate 202 and housing 204.

The housing 204 is coupled with a flexible gooseneck 208 having a sealed microphone 206. The sealed microphone 206 is located at one end of the flexible gooseneck 208 and may be attached with adhesive. Alternatively, the microphone may be attached to the end of the gooseneck 208 via a multi-part housing that is sonically, or otherwise, welded together to seal the microphone. In either case, the bonding between the microphone 206 and the gooseneck 208 creates a water-tight seal that prevents moisture from affecting the microphone 206. In one embodiment, the flexible gooseneck 208 comprises a helical spring covered with a suitable flexible plastic or similar material. Such a construction allows the operator to easily position the microphone 206 at a comfortable and useful position.

The flexible gooseneck portion 208 extends from the microphone 206 up to a strain relief section 210, that is constructed from a soft plastic or elastomeric material, and is secured within the strain relief section 210 via a crimp ring (not shown) or similar mechanism. The strain relief section 210 fits within the housing 204 and a cover 214. To help secure the assembly together, the posts 216 may advantageously be used to secure the strain relief section 210 within the housing 204 and the cover 214.

The housing 204 and the cover 214 are each constructed of a polycarbonate/ABS plastic mix and are sonically welded along all edges of the cover 214 to seal the cover 214 to the housing 204. Wires 218 extend from the microphone 206, through the gooseneck section 208 and into the housing 204. Thus, these wires are sealed against moisture and condensation entering at the strain relief portion 210. The wires terminate at a connector 220 to which they can be crimped or soldered.

The housing 204 is connected with a speaker housing 222 by snapping over the speaker housing 222 to form a friction fit. The speaker housing 222 includes a groove 224 in which a silicon o-ring 226 fits. This arrangement permits the housing 204 to rotate around the speaker housing 222 while ensuring a fluid-tight seal between the speaker housing 222 and the housing 204. In certain embodiments, the groove 224 may include detents that releasably "lock" the housing in certain positions. In this manner, the operator can position the microphone in a comfortable and useful position.

Similar to the housing 204, the speaker housing 222 is constructed from a polycarbonate/ABS plastic mix. Opposite the side with the groove 224, the speaker housing 222 includes a cavity 228 which is shaped to receive a printed circuit board 230 and the speaker 232. The speaker housing 222 includes an anchor assembly 234 that accommodates an cable 236 that extends from the printed circuit board 230. In an alternative embodiment that uses a wireless connection, the cable 236 can be omitted.

The top of the cable 236 is covered with an elastomer coating and includes a series of splines for strain relief purposes. The top spline 238 is shaped to be received within the anchor assembly 234 in order to create a seal when the headset module 200 is assembled. The cable 236 is electrically coupled with the printed circuit board 230 that also includes a connector 240 that mates with the microphone connector 220 within the housing 204. The exemplary printed circuit board 230 includes the electronic circuitry to operate the headset module 200.

The printed circuit board 230 nests within a carrier 242 that is advantageously constructed from polycarbonate/ABS plastic. A gasket 244 is sandwiched between a speaker element 245 and the carrier 242. The gasket 244 may be constructed from a closed-cell foam such as neoprene, or a similar material. As for the speaker element 245, two leads 246 extend from the element 245 and mate with the printed circuit board 230 where they can be soldered or otherwise attached.

Another neoprene, or similar material, gasket 248 is sandwiched between the speaker element 244 and a cover 250. According to one embodiment of the present invention, the gasket 248 is covered with mylar. The cover 250 fits over the speaker housing 222 to securely hold the speaker element 244 and the printed circuit board 230. The cover 250 is advantageously constructed with polycarbonate/ABS plastic and is sonically welded with the speaker housing 222. Thus, the sonic weld around the entire periphery of the speaker housing 222 and cover 250, the presence of the closed-cell foam gaskets 244 and 248, and the top spline 238 interaction within the anchor assembly 234, all cooperate to create a headset module 200 that is sealed against moisture and other fluids. Thus, the headset module 200 can withstand being exposed to humid environments and also withstand large temperature variations that often lead to condensation or other moisture. In particular, the exemplary headset module described herein satisfies the requirements of the IP-67 standards regarding electronic enclosures.

Figure 3A:
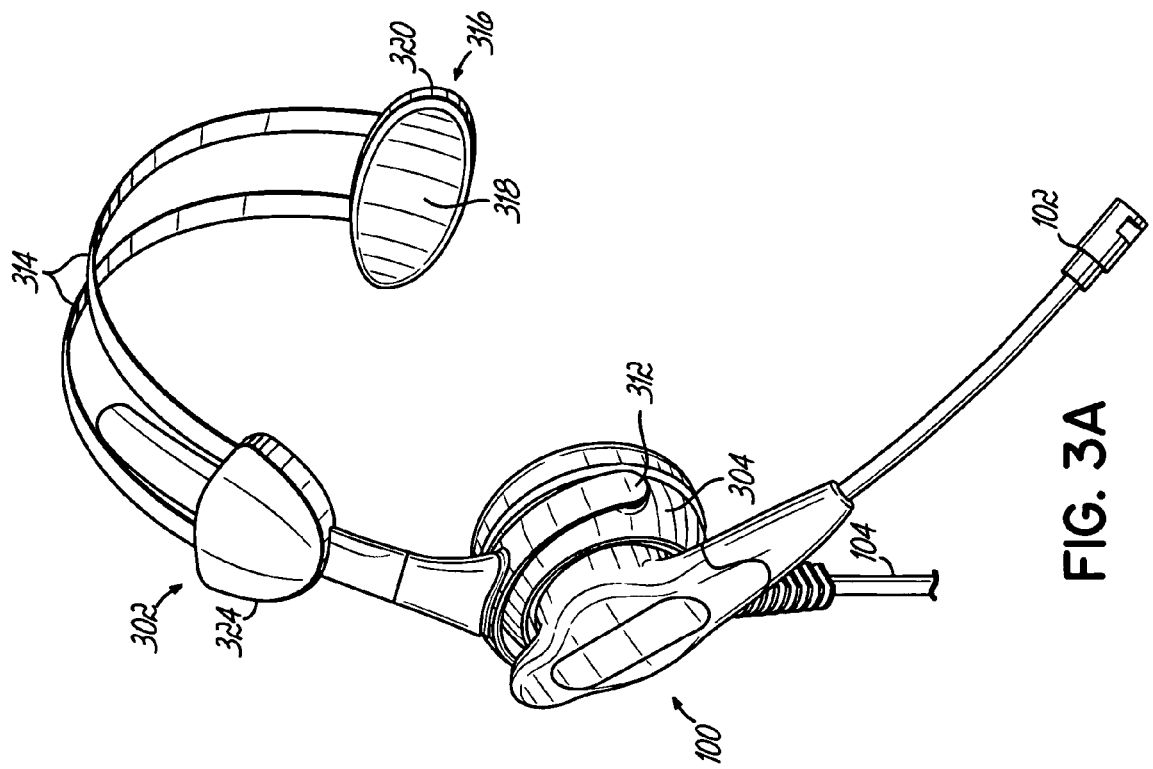
FIGS. 3A and 3B illustrate, respectively, a headset module coupled with a lightweight headset frame and a high-noise headset frame.

As mentioned previously, the headset module 200 of the present invention is coupled with a headset frame that is used by an operator. FIG. 3A illustrates a module 100 (referring back to FIG. 1) and headset frame 302. In particular, the headset frame 302 includes a relatively small earpiece 304 that allows the module 100 and frame 302 to be a relatively lightweight assembly. The module 100 include detents 120 (see FIG. 1) that cooperate with fingers (not shown) or other resilient members within a cavity of the earpiece 304. The fingers may be resilient protrusions that engage the detents 120 when the module 100 is placed within the cavity of the earpiece 304. One of ordinary skill will recognize that other types of releasable mechanisms may be used to temporarily attach the module 100 and the earpiece 304. For example, the detents may be included within the cavity while the resilient fingers are located on the outside of the module 100. Additionally, more or less fingers and detents may be used than those explicitly shown in FIG. 1.

The headset frame 302 includes a yoke 312 that attaches to two bands 314. In order to provide durability and to resist moisture and temperature fluctuations, the bands 314 are advantageously constructed from stainless steel or, alternatively, nickel-plated cold-rolled steel. Both materials provide more reliability and strength than plastic. A bumper 316 is provided that is located opposite the earpiece 304. The bumper 316 advantageously includes a closed-cell foam portion 318 that attaches to the bands 314 through a mount 320. Similar to the bands 314, the mount 320 is preferably constructed from stainless steel or nickel-plated steel. The yoke 312 can be constructed from polycarbonate/ABS plastic and is useful to secure the earpiece 304 to the bands 314. As known to a skilled artisan, the yoke 312 may be attached to the bands 314 via a ratchet 324 that permits the sizing of the headset frame 302 to be adjusted to accommodate different users. One of ordinary skill would also recognize that the headset frame of FIG. 3A is exemplary in nature and a number of variations may be made without departing from the scope of the present invention.

Figure 3B:
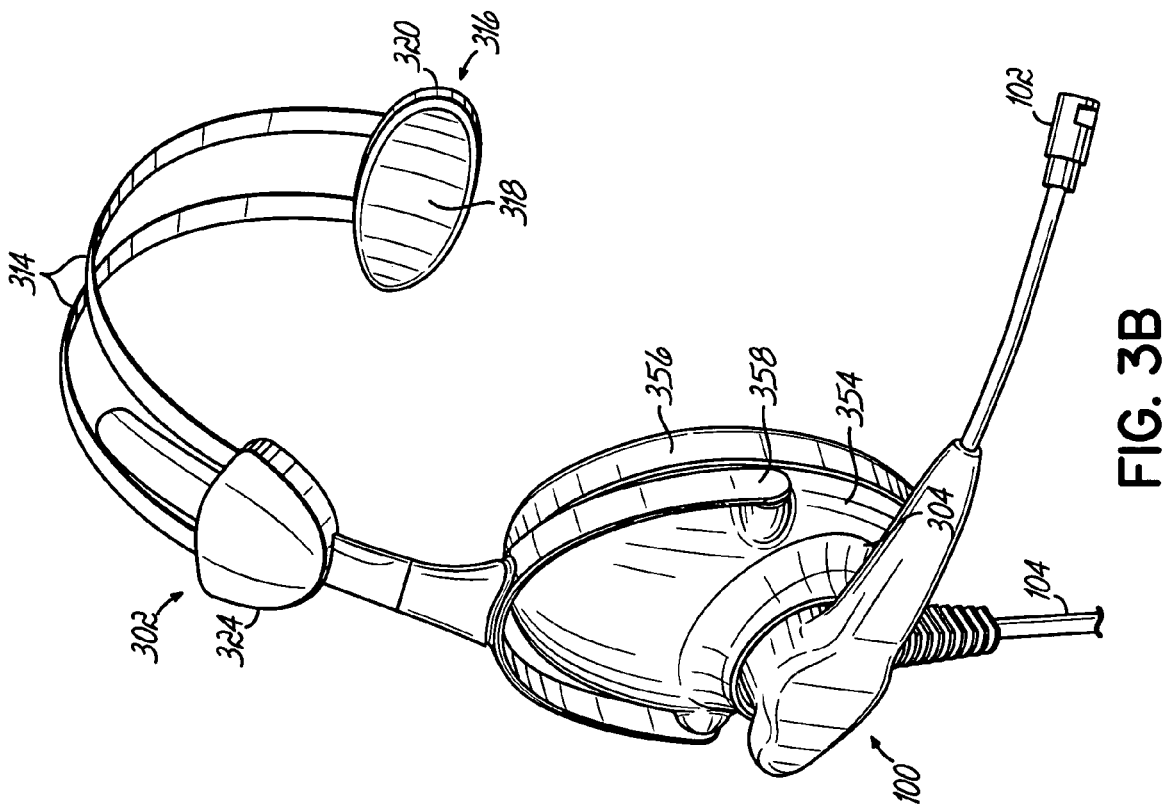

In FIG. 3B, the earpiece 354 is relatively larger than the module 100. This type of earpiece 354 is advantageously used in an environment where high levels of ambient noise may be encountered. The larger ear pad 356 is able to encompass an operator's ear and provide better performance. The yoke 358 is shaped larger than the yoke 312 of FIG. 3A in order to accommodate the larger earpiece 354. Otherwise, the same bands, bumpers and ratchet may be used. Accordingly, the same module 100 may be used in either headset frame thereby reducing the number of different headset modules that must be designed, manufactured, repaired and warehoused.

Figure 4:
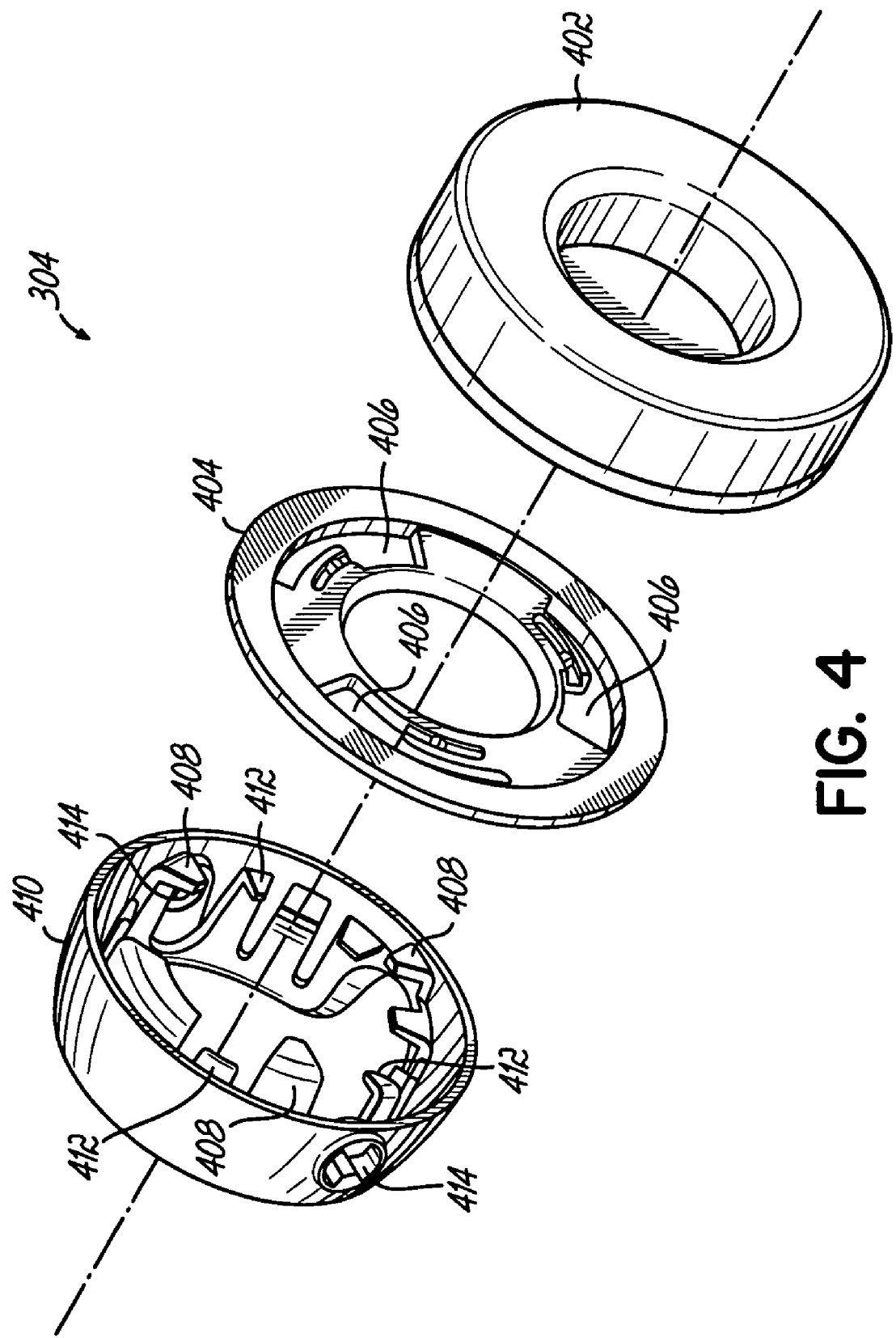
FIG. 4 illustrates an exemplary headset earpiece to couples with the headset module of FIG. 1

FIG. 4 depicts an exploded view of an exemplary earpiece that accepts the headset module 100. The earpiece 304 of FIG. 4 is similar to the lightweight earpiece depicted in FIG. 3A. However, the same structure and features, described herein, are incorporated in the earpiece 354 as well.

The earpiece 304 includes an ear pad 402 that is coupled with a locking mechanism 404. The ear pad 402 may friction fit around the periphery of the locking mechanism 404 or be attached via adhesive. The locking mechanism 404 includes openings 406 that engage tabs 408 on the housing 410. In the exemplary embodiment of FIG. 4, there are three openings 406. More or less opening may be used without departing from the scope of the present invention. As shown, the locking mechanism 404 assembles to the housing 410 when the tabs 408 extend through the openings 406 and the housing 410 is rotated. Thus, the housing 410, the locking mechanism 404 and the ear pad 402 are coupled together. One of ordinary skill would recognize that there are functionally equivalent methods to attach the ear pad 402 to the housing 410. The exemplary method depicted in FIG. 4 is advantageous in that screws or other extraneous fasteners are not necessary. However, such methods, as well as others, are contemplated within the scope of the present invention. For example, one alternative to the twist-and-lock feature of mechanism 404, a push-and-lock mechanism could be employed as well.

The housing 410 includes fingers 412 that engage the detents 120 of the headset module 100. The bias of the fingers 412 is such that they securely hold the headset module 100 within the housing 410 but allows the module 100 to be removed with force is exerted opposite the bias of the fingers 412. The housing also includes openings 414 that accept a yoke of a headset (as shown in FIG. 3A.

Accordingly, a headset has been shown that includes a moisture-proof and temperature resistant headset module. The headset module is sealed against moisture and is constructed from materials that are durable and can withstand constant use, physical abuse, and rapid swings in temperature and other environmental conditions. Furthermore, the headset module is interchangeable with a variety of headset frames so as to provide comfort during prolonged use and in high ambient noise environments.

The invention claimed is:

1. A headset module comprising:
   a microphone assembly sealed against moisture and including a circular cavity;
   an electronic enclosure containing a speaker element and sealed against moisture, the enclosure having a circular end configured to fit within the circular cavity of the microphone assembly;
   a sealing element located within the circular cavity to engage the circular end so the electronic enclosure is coupled with the microphone assembly via a first moisture-proof seal;
   the circular cavity including sides that friction fit against the circular end for rotation of the microphone assembly with respect to the electronic enclosure.

2. The headset module of claim 1, wherein the microphone assembly includes:
   a microphone sealed against moisture;
   a flexible gooseneck coupled with the microphone;
   one or more wires extending through the flexible gooseneck; and
   a housing coupled to the flexible gooseneck via a second moisture-proof seal.

3. The headset module of claim 2, wherein the flexible gooseneck and the housing are sonically welded together.

4. The headset module of claim 2, wherein the second moisture proof seal includes:
   a strain relief cover;
   a surface on the housing configured to receive the strain relief cover; and
   a sonic weld between the strain relief cover and the surface.

5. The headset module of claim 4, wherein the housing and the strain relief cover are constructed from polycarbonate/ABS plastic.

6. The headset module of claim 1, wherein:
   the sides include a plurality of first surfaces; and
   the circular end includes a plurality of second surfaces each shaped to engages the first surfaces, whereby the circular end may be releasably positioned in one of multiple positions in which one of the first surface engages one of the second surfaces.

7. The headset module of claim 1, wherein:
   the electronic enclosure includes a first half and a second half that couple together and are sonically welded together along a substantial portion of a mating surface where the two halves are adjacent.

8. The headset module of claim 1, further comprising:
   a cable assembly that extends through an opening of the electronic disclosure.

9. The headset module of claim 8, wherein the cable assembly includes a surface that engages the opening of the electronic assembly to create a second moisture-proof seal.

10. The headset module of claim 8, wherein:
    the cable assembly includes a plurality of splines;
    the electronic enclosure includes a opening with a groove, wherein the groove is shaped to sealingly engage at least one of the splines.

11. The headset module of claim 1, wherein the speaker element is sandwiched between two gaskets.

12. The headset module of claim 1, further comprising a electronic assembly comprising:
    a printed circuit board coupled with a cable assembly;
    a circuit board holder configured on a first side to accept the printed circuit board;
    a first gasket sealingly engaging a second side of the circuit board holder;
    the speaker element having a third side adjacent the first gasket;
    a second gasket sealingly engaging a fourth side of the speaker element;
    a mylar coating across the second gasket.

13. The headset module of claim 1, wherein:
    the electronic enclosure includes a first half and a second half that seal together; and
    the electronic assembly is enclosed within the sealed first and second halves.

14. The headset module of claim 1, wherein the headset module satisfies the requirements for electronic enclosures specified by IP-67.

15. The headset module of claim 1, further comprising:
    a first surface configured to engage a complimentary surface on a headset frame such that the headset module and the headset frame are releasably coupled.

16. The headset module of claim 15, wherein the first surface includes one or more tabs.

17. A headset assembly comprising:
    a headset module with a microphone and speaker, the headset module being resistant to moisture infiltration and including a first surface that has at least one of a detent or resilient member;
    an earpiece including an ear pad and a housing coupled with the ear pad;
    the earpiece including a second surface that is configured to engage the first surface, the second surface including at least one of a detent or resilient member wherein when the first and second surfaces are engaged, the detent and resilient member engage and the headset module and the earpiece are releasably coupled together; and
    a headset frame configured to couple with the earpiece.

18. The headset assembly of claim 17 wherein:
the headset frame and the earpiece are configured for a high ambient noise environment.

19. The headset assembly of claim 17, wherein the headset frame and the earpiece are configured for a lightweight environment.

20. The headset assembly of claim 17, wherein the headset frame includes:
a yoke constructed from polycarbonate/ABS plastic;
a band arrangement coupled at a first end with a yoke, the band arrangement; and
a bumper coupled with a second end of the band arrangement.

21. The headset assembly of claim 20, wherein the band arrangement is constructed from one of stainless steel and nickel-plated steel.

22. The headset assembly of claim 17, wherein the earpiece comprises:
a locking mechanism coupled with the ear pad; and
the housing coupled with the locking mechanism, wherein the second surface is located on the housing.

23. The headset assembly of claim 22, wherein the locking mechanism and the housing couple together without separate fasteners.

24. A headset frame comprising:
a band arrangement;
a bumper coupled with one end of the band arrangement; and
an ear piece coupled with another end of the band arrangement, the ear piece including an enclosure configured to receive a headset module,
the headset module including:
a speaker and a microphone;
wherein the earpiece is configured with a surface to releasably engage a corresponding surface of the headset module when the headset module is received within the enclosure of the ear piece; so that a single headset module might be selectively utilized with various different headset frames and earpieces.

25. The headset frame of claim 24, wherein the frame is one of a high ambient noise model and a lightweight model.

26. The headset frame of claim 24, wherein the band arrangement is constructed from one of stainless steel and nickel plated steel.

27. The headset frame of claim 24, wherein the headset module is resistant to water infiltration.

* * * * *

UNITED STATES PATENT AND TRADEMARK OFFICE
CERTIFICATE OF CORRECTION

| | |
|---|---|
| PATENT NO. | : 7,391,863 B2 |
| APPLICATION NO. | : 10/874972 |
| DATED | : June 24, 2008 |
| INVENTOR(S) | : Viduya et al. |

It is certified that error appears in the above-identified patent and that said Letters Patent is hereby corrected as shown below:

On the Title Page, Item (56) References Cited, reads "5,890,074 A   3/1999   Rydbeck" and should read -- 5,890,075 A   3/1999   Rydbeck --.

Column 1, line 66, reads "FIG. 4 illustrates an exemplary headset earpiece to couples..." and should read -- FIG. 4 illustrates an exemplary headset earpiece to couple... --.

Column 2, line 54, reads "...complimentary shaped cavity 203 within..." and should read --...complementary shaped cavity 203 within... --.

Column 3, lines 37-38, reads "...assembly 234 that accommodates an cable 236 that extends..." and should read -- ...assembly 234 that accommodates a cable 236 that extends... --.

Column 4, line 17, reads "The module 100 include detents 120..." and should read -- The module 100 includes detents 120... --.

Column 5, line 4, reads "More or less opening may be used without..." and should read -- More or less openings may be used without... --.

Column 5, line 22, reads "...removed with force is exerted opposite the..." and should read -- ...removed when force is exerted opposite the... --.

Column 5, line 24, reads "...(as shown in FIG. 3A." and should read -- ...(as shown in FIG. 3A.) --.

Column 6, line 4, CLAIM 6, reads "...shaped to engages the first surfaces,..." and should read -- ...shaped to engage the first surfaces,... --.

Column 6, line 6, CLAIM 6, reads "...positions in which one of the first surface engages one of..." and should read -- ...positions in which one of the first surfaces engages one of... --.

Signed and Sealed this
Twenty-second Day of March, 2011

David J. Kappos
*Director of the United States Patent and Trademark Office*

CERTIFICATE OF CORRECTION (continued)
U.S. Pat. No. 7,391,863 B2

Column 6, lines 14-15, CLAIM 8, reads "...extends through an opening of the electronic disclosure." and should read -- ...extends through an opening of the electronic enclosure. --.

Column 6, line 21, CLAIM 10, reads "...enclosure includes a opening with a groove,..." and should read -- ...enclosure includes an opening with a groove,... --.

Column 6, lines 26-27, CLAIM 12, reads "...further comprising a electronic assembly comprising:" and should read -- ...further comprising an electronic assembly comprising: --.

Column 6, line 48, CLAIM 15, reads "...configured to engage a complimentary surface..." and should read -- ...configured to engage a complementary surface... --.

Column 7, lines 10-11, CLAIM 20, reads "...a band arrangement coupled at a first end with a yoke, the band arrangement; and" and should read -- ...a band arrangement coupled at a first end with a yoke; and --.